No. 727,829. PATENTED MAY 12, 1903.
J. J. O'CONNELL.
CABLE TERMINAL.
APPLICATION FILED OCT. 13, 1902.
NO MODEL.
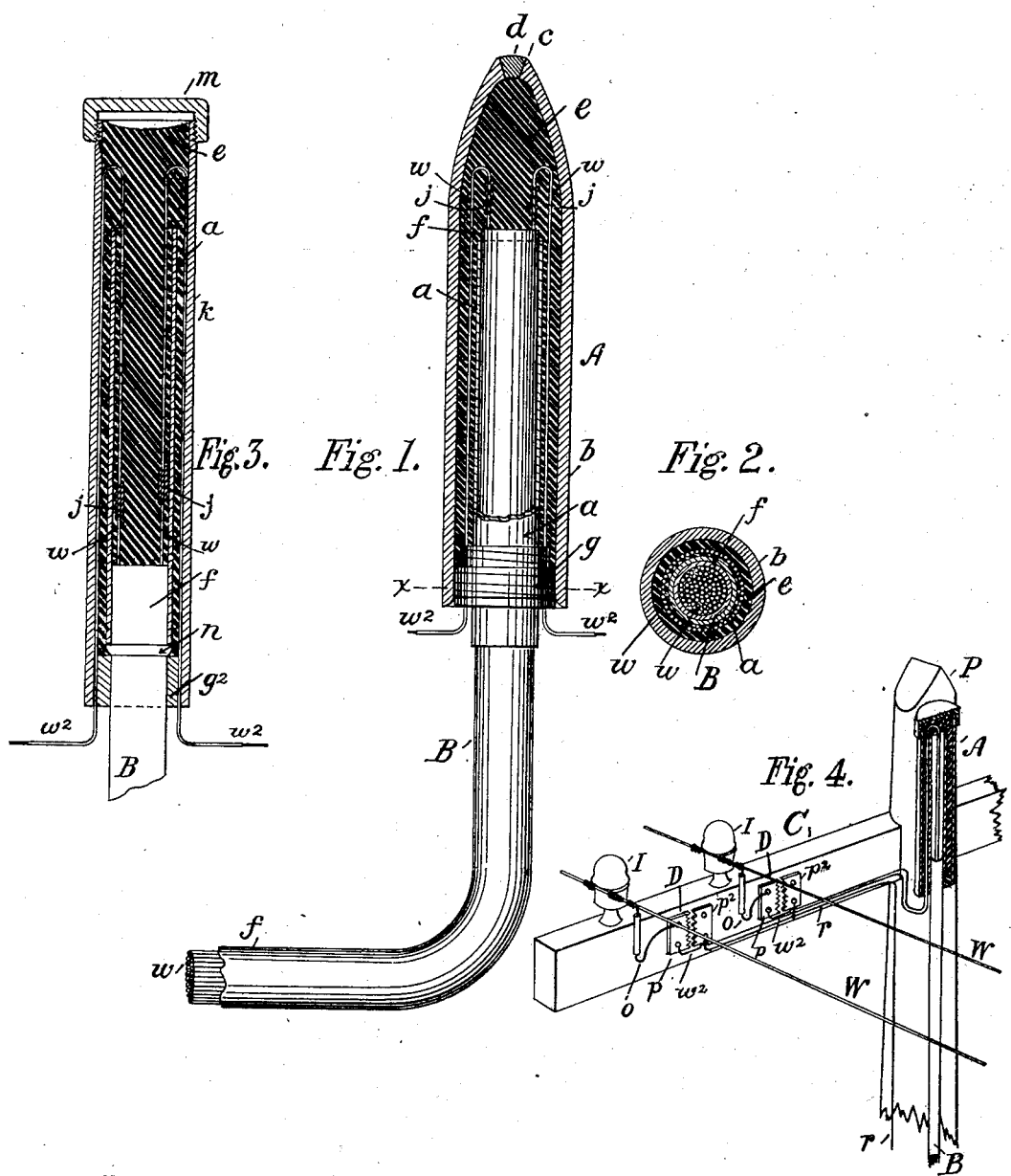

No. 727,829.

Patented May 12, 1903.

UNITED STATES PATENT OFFICE.

JOSEPH J. O'CONNELL, OF CHICAGO, ILLINOIS, ASSIGNOR TO AMERICAN TELEPHONE AND TELEGRAPH COMPANY, A CORPORATION OF NEW YORK.

CABLE-TERMINAL.

SPECIFICATION forming part of Letters Patent No. 727,829, dated May 12, 1903.

Application filed October 13, 1902. Serial No. 127,111. (No model.)

*To all whom it may concern:*

Be it known that I, JOSEPH J. O'CONNELL, residing at Chicago, in the county of Cook and State of Illinois, have invented certain Improvements in Cable-Terminals, of which the following is a specification.

This invention relates to the means employed in connection with the terminal ends of electric cables by which the inclosed conductors are brought out and adapted to be conveyed to the translating devices with which they are to be connected. Great precautions are made with such cables to keep the insulated conductors dry and to prevent moisture from coming in contact with them, and the endeavor is made when the conductors are to emerge from the cable to provide suitable means, as cable heads or terminals, whereby the conductors are rendered accessible and their insulation within the cables maintained without loss.

The present invention has for its object to provide a cable head or terminal simple in design, comparatively inexpensive in manufacture, and adapted to the purpose designed, and which at the same time will impart to the cable-conductors considerable impedance and obstruct currents of high intensity, as lightning discharges, and prevent damage to the conductors.

The cable is secured in a vertical position, and a cylinder, tube, or pipe of iron is placed upon its end. The cable-conductors are spliced to rubber-insulated conductors, which are carried up and then bent over the upper edge of the cable and pipe and carried downward to a distance equal to the length of the pipe and preferably a little below the pipe, at which point they are extended outward. The end of the cable, the returned conductors, and the iron pipe are covered with a cap, which may be of lead or iron, and liquid insulation, as ozite, is poured into the upper end of the cap, which is afterward sealed, all in a manner which I will now proceed to describe, and point out in the appended claims.

Of the drawings, Figure 1 is a sectional elevation of the invention, and Fig. 2 is a section on line $x\ x$ of the previous figure. Fig. 3 is a section of a modification, and Fig. 4 illustrates the attachment of the invention to a telephone-pole.

Referring to Figs. 1 and 2, B represents a cable consisting of the conductors $w$, which may be insulated by paper or any other suitable material and inclosed in a lead sheath $f$.

To prepare the cable-terminal for the attachment of the cable-head, its lead sheath $f$ is cut off for a sufficient distance to leave the conductors $w$ long enough to make splices $j$ with the extension-conductors $w^2$, which are commonly insulated with okonite or rubber waterproof insulation. A cylinder or pipe $a$ of soft iron is forced upon the end of the lead sheath for a purpose to be hereinafter named. After the joints $j$ are made and properly insulated the conductors $w^2$ are bent downward and extended parallel with the outer surface of the pipe $a$ to about the lower end of the pipe and then turned outward. The conductors $w^2$ are slightly separated from the surface of the pipe $a$ and are held in position by rubber binding-tape $g$, which is first wound onto the pipe for a turn or two and then over the conductors, which are separated and spaced from one another around the pipe. The tape is then wound hard and thick enough to constitute a plug for the end of the lead cap $b$, which is made to extend quite a distance beyond the end of the cable in order to inclose the looped conductors $w\ w^2$ and to form a chamber. The end of the cap $b$ is provided with an opening $c$, through which is poured paraffin, ozite, or other suitable insulating material $e$, which fills in between the conductors and between the surfaces of the iron pipe and of the lead cap, completely driving out all air and moisture from the interior of the cap, after which the opening $c$ is closed with solder $d$. The conductors $w$ pass upward in proximity to the inner surface of the iron pipe $a$ and then downward over the outer surface thereof, and in virtue of their electromagnetic relation to the iron of said pipe thus established the impedance offered by them to sudden oscillatory impulses of great strength, such as lightning discharges, is increased.

In the modification shown in Fig. 3 the iron pipe $a$ extends beyond the end of the cable B, its lower end rests upon a ring $n$ of solder, and the cap consists of an iron pipe $k$, whose lower end may be closed by a plug or ring $g^2$, while its upper end has a cover $m$ screwed thereupon. In this modification the conductors $w^2$ pass between the walls of the two pipes $a$ and $k$ and greater impedance to sudden currents of great strength—such as lightning discharges—is thus obtained in each conductor.

Fig. 4 shows a way of applying the invention to a pole. The device A is secured to the upper end of the pole in any suitable way, as by bolts or staples. The cable may be carried along a pole-line to the central station, and two conductors $w^2$ are brought out from the cable to the plate $p$ of the lightning-arresters D D upon the cross-arm C and connected by bridles $o$ to the line-wires W W, carried by the insulators I I. The second plates $p^2$ of the arresters are connected by conductor $r$ with the ground.

In the event of lightning or sudden powerful currents coming upon the line-wires W W the impedance produced in the conductors $w^2$ by their passage between the pipe $a$ and pipe $k$ causes the current to be diverted through the arresters to ground as the course of least opposition, and the cable is protected from its destructive effects.

Fig. 4 is illustrative of one way only of applying the invention, which is adapted to any place where conductors are to be brought out from a cable for telephone-service.

I claim as my invention—

1. The combination of a cable composed of a sheath and insulated conductors which are extended or returned upon the outside of the sheath; with a cap inclosing the cable end and the said returned conductors, the space between the cable end and the cap being hermetically sealed with suitable liquid insulation, as set forth.

2. The combination of a cable composed of a lead sheath and insulated conductors, an iron tube upon the cable end, the conductors returned upon the outside of the tube and secured thereto by an insulating-plug through which they pass; with a cap inclosing the cable end the lower portion of which is closed by said plug, and its opposite part hermetically sealed, the space between the cable end and the cap being filled with suitable insulation, as set forth.

3. The combination of a cable composed of a lead sheath and insulated conductors which are extended or returned upon the outside of the sheath and secured thereto by an insulating-plug of tape through which they pass; with a lead cap inclosing the cable end the lower portion of which is closed by said plug and its opposite part hermetically sealed, the space between the cable end and the cap being filled with liquid insulation, as set forth.

4. The combination of a cable composed of a sheath and paper-insulated conductors which are joined with waterproof insulated conductors externally of the cable, the latter conductors being returned upon the outside of the sheath and secured thereto by an insulating-plug through which they pass; with a cap inclosing the cable end the lower portion of which is closed by said plug and its opposite part hermetically sealed, the space between the cable end and the cap being filled with suitable insulation, as set forth.

5. The combination of a cable consisting of a lead sheath and paper-insulated conductors which are joined with waterproof insulated conductors externally of the cable, the latter conductors returned upon the outside of the sheath and secured thereto by an insulating-plug of tape through which they pass; with a lead cap inclosing the cable end the lower portion of which is closed by said plug and its opposite part hermetically sealed, the space between the cable end and the wall of the cap being filled with liquid insulation, as set forth.

6. The combination of a cable composed of a lead sheath inclosing insulated conductors extended or returned upon the outside of the said sheath, means for increasing the impedance of the said conductors upon the cable end, with a cap inclosing the cable end, the returned conductors and the said impedance means, the space between the cable and the cap being hermetically sealed with liquid insulation.

7. The combination of a cable composed of a sheath and insulated conductors, of an iron sheath upon the end of the cable-sheath, the conductors extended or returned upon the outside of the sheath, with a cap inclosing the cable end the iron sheath and the returned conductors, the space between the cable and the cap being hermetically sealed with liquid insulation.

In testimony whereof I have signed my name to this specification, in the presence of two subscribing witnesses, this 9th day of October, 1902.

JOSEPH J. O'CONNELL.

Witnesses:
ARTHUR D. WHEELER,
GEORGE E. CHIPMAN.